No. 850,011. PATENTED APR. 9, 1907.
J. B. JOBSON.
PLOW.
APPLICATION FILED OCT. 24, 1906.
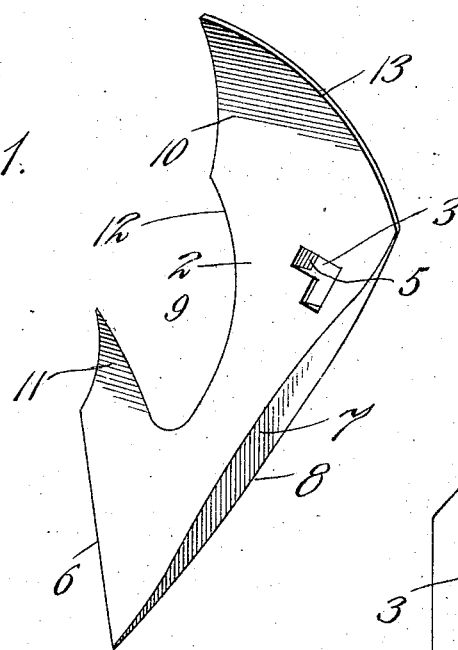
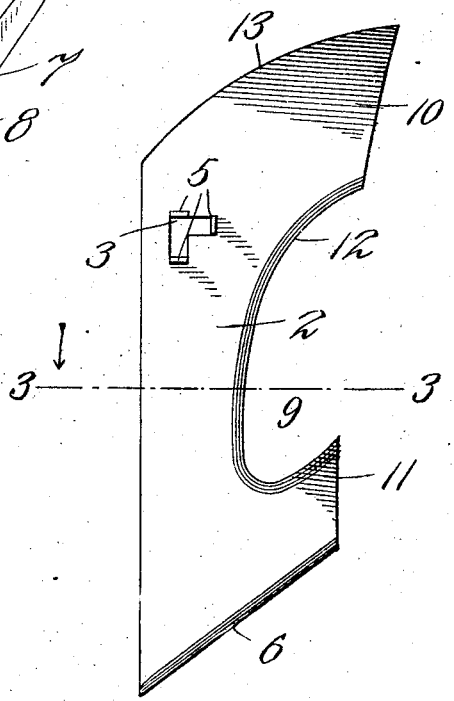
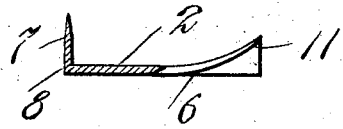
Witnesses
Geo. Ackman Jr.
F. S. Elmore
Inventor
John B. Jobson
By Victor J. Evans
Attorney

UNITED STATES PATENT OFFICE.

JOHN B. JOBSON, OF ATLANTA, GEORGIA.

PLOW.

No. 850,011.  Specification of Letters Patent.  Patented April 9, 1907.

Application filed October 24, 1906. Serial No. 340,376.

*To all whom it may concern:*

Be it known that I, JOHN B. JOBSON, a citizen of the United States, residing at Atlanta, in the county of Fulton and State of Georgia, have invented new and useful Improvements in Plows, of which the following is a specification.

This invention relates to plow-blades, and has for its objects to produce a comparatively simple inexpensive device of this character which in action will turn the earth or subsoil at a point below the ground-surface, one which will also turn the earth or surface soil at the ground-surface and deposit the surface soil thus turned onto the previously-turned subsoil, thereby effecting a thorough breaking and turning of the earth with a consequent increase in efficiency of the plow, one wherein the blade will pass smoothly and readily through the ground, and one whereby the roots or vines encountered by the blade will be cut to facilitate free passage of the blade, the vine-cutting knife serving the further function of a brace for strengthening the blade.

With these and other objects in view the invention comprises the novel features of construction and combination of parts more fully hereinafter described.

In the accompanying drawings, Figure 1 is a perspective view of a plow-blade embodying the invention. Fig. 2 is a rear view of the same. Fig. 3 is a cross-section taken on the line 3 3 of Fig. 2.

Referring to the drawings, it will be seen that the blade 2, forming the subject-matter of the invention and which may be attached to a stock (not shown) of usual form and material, is provided at a point near its upper end with a substantially L-shaped opening 3 to receive a connecting-bolt, while projecting outwardly from the rear face of the blade is a plurality of bearing-lugs 5, composed of material struck from the opening 3 and adapted to seat in the foot of the stock for holding the blade firmly in position thereon.

The blade 2, which has a lower cutting edge 6, is provided at the left or land side with a longitudinally-extending cutting-knife 7, turned at right angles to the blade 2 and having its outer active edge sharpened, as at 8, this knife, which is designed for cutting weeds or roots 7 during the passage of the blade through the ground, being extended throughout substantially the entire length of the blade and serving to brace and strengthen the latter.

The plow-blade is cut away or recessed at its right or furrow side and at a point between its ends, as at 9, to form an upper wing or moldboard 10 and a lower wing or moldboard 11, which, together with the wing 10, is curved laterally and forwardly, as shown, to adapt the wings for turning the soil, it being noted in this connection that the moldboard 11 travels at a depth below the ground-surface and slightly in advance of moldboard 10, which passes through the soil at a point adjacent the surface-level, and, further, that by the provision of the recess 9 the blade is adapted to pass more freely through the ground. The edge of the recess 9 is sharpened, as at 12, for cutting its passage through the soil, while the blade 2 is provided with a downwardly and inwardly curved upper edge 13, whereby weeds or other matter of a similar nature lying within the path of the upper moldboard 10 will either be caught and carried under with the soil turned thereby or be pushed to the left, leaving the point free.

In practice as the blade advances through the ground the earth or subsoil below the ground-surface will be turned by the subsoiling wing or moldboard 11, while the earth near the ground-surface will be turned by the upper wing or moldboard 10 onto the soil previously turned by the wing 11. Also in the operation of the plow the knife 7, which constitutes a brace for strengthening the blade 2 to prevent bending or buckling of the latter at its center, acts to cut the weeds or roots which may be encountered by the blade, and thus facilitate the passage of the latter through the ground.

It is to be particularly observed that under the improved device and owing to the provision of the upper and lower blades a double turning of the soil is effected, thus more thoroughly breaking the ground to render the plow operation more effective, and, further, that by forming the recess 9 in the blade not only is the lower moldboard produced, but the blade adapted for easier travel through the ground.

It will be understood, of course, that the features of improvement may, in so far as their operation is not affected one by the other, be embodied either singly or collectively in any form of plow to which they may be applicable.

Having thus described my invention, what I claim is—

1. A plow-blade provided with a pair of soil-turning wings or moldboards disposed one above the other and both curved laterally and forwardly, one of said wings being designed to turn the subsoil beneath the ground-surface and the other to turn the surface soil over onto the subsoil.

2. A plow-blade having one of its edges recessed to form a pair of soil-turning wings or moldboards disposed one above the other and both curved laterally and forwardly, one of said wings being designed to turn the subsoil beneath the ground-surface and the other to turn the surface soil over onto the subsoil.

In testimony whereof I affix my signature in presence of two witnesses.

JOHN B. JOBSON.

Witnesses:
M. E. GARRISON,
B. E. DEWBERRY.